United States Patent [19]

Hoshi et al.

[11] 4,221,710

[45] Sep. 9, 1980

[54] PROCESS FOR PREPARING MICROCAPSULES BY POLYMERIZATION OF UREA AND FORMALDEHYDE IN THE PRESENCE OF GUM ARABIC

[75] Inventors: Yoshiyuki Hoshi; Hiroharu Matsukawa, both of Fujinomiya, Japan

[73] Assignee: Fuji Photo Film Co., Ltd., Minami-ashigara, Japan

[21] Appl. No.: 12,088

[22] Filed: Feb. 14, 1979

[30] Foreign Application Priority Data

Feb. 14, 1978 [JP] Japan ................................. 53-15675

[51] Int. Cl.² ............................................. C08L 5/00
[52] U.S. Cl. .................................... 260/17.3; 252/316; 260/17.2; 427/150; 427/151; 427/208.4; 528/232
[58] Field of Search ........................................ 260/17.3

[56] References Cited

U.S. PATENT DOCUMENTS

| | | | |
|---|---|---|---|
| 3,844,816 | 10/1974 | Vassiliades et al. | 252/316 |
| 3,993,831 | 11/1976 | Vassiliades | 427/151 |
| 4,089,802 | 5/1978 | Foris et al. | 427/151 |
| 4,115,474 | 9/1978 | Vassiliades et al. | 252/316 |

OTHER PUBLICATIONS

C.A. vol. 72:67897c, Small Polymer Capsules, Yoshida.

*Primary Examiner*—Edward M. Woodberry
*Attorney, Agent, or Firm*—Sughrue, Rothwell, Mion, Zinn and Macpeak

[57] ABSTRACT

A capsule solution is prepared by polymerizing urea and formaldehyde in the presence of gum arabic to thereby form a urea-formaldehyde resin wall around a hydrophobic oily solution. The use of gum arabic reduces the viscosity of the capsule solution, the capsule solution which is obtained is particularly suitable for preparing pressure sensitive recording sheets.

16 Claims, No Drawings

PROCESS FOR PREPARING MICROCAPSULES BY POLYMERIZATION OF UREA AND FORMALDEHYDE IN THE PRESENCE OF GUM ARABIC

BACKGROUND OF THE INVENTION

1. Field of the Invention

The present invention relates to a process for producing hydrophobic oil droplet-containing capsules having a urea-formaldehyde resin wall layer. More particularly it relates to a process for producing microcapsules which comprises polymerizing urea and formaldehyde around a previously dispersed hydrophobic oleophilic liquid to form a urea-formaldehyde wall reducing the viscosity of the capsule solution.

2. Brief Description of the Prior Art

In forming a urea-formaldehyde resin wall around a hydrophobic oleophilic liquid previously dispersed by polymerizing urea and formaldehyde, studies directed to the use of a specific high molecular weight electrolyte have already been made. For example, U.S. Pat. No. 4,001,140 reports the use of ethylene-maleic anhydride copolymers, vinyl methyl ether-maleic anhydride copolymers or polyarcylic acids. However, a microcapsule solution using these high molecular weight electrolytes generally has a high viscosity. Particularly when the pH of the microcapsule solution is neutralized, it becomes highly viscous and serious drawbacks are encountered preparing a pressure sensitive recording paper using these high molecular weight electrolytes. Upon coating a microcapsule solution onto a support such as a paper sheet or the like, as the solution stands its viscosity becomes too high so that the solution must be diluted with water. For this reason, the drying load becomes large and presents a serious problem to manufacture.

In addition, as is mentioned in U.S. Pat. No. 4,001,140, in the system in which urea is polymerized with formaldehyde in the presence of ethylene-maleic anhydride copolymers or vinyl methyl ether-maleic anhydride copolymers to form a urea-formaldehyde wall, it is difficult to clean up the matter deposited on the wall of a reaction vessel, particularly when it is dried. Such deposited matter can be washed out with warm water only with difficulty.

SUMMARY OF THE INVENTION

Accordingly, a principal object of the present invention is to provide a process for preparing a solution of capsules having a urea resin wall having low viscosity and high concentration in a simple manner.

A second object of the present invention is to provide a process for preparing capsules in high concentration without the accompaniment of any aggregation.

A third object of the present invention is to provide a process for preparing capsules having a shortened period of reaction time.

A fourth object of the present invention is to provide a process for preparing capsules which minimizes the deposition of resin on the reaction vessel and which is capable of being easily washed out.

A fifth object of the present invention is to provide a process for preparing capsules at low cost.

These and other objects have been achieved by polymerizing urea and formaldehyde in the presence of gum arabic and allowing a urea-formaldehyde wall to form around a previously dispersed hydrophobic oily liquid.

DETAILED DESCRIPTION OF THE INVENTION

Gum arabic which can be employed in accordance with the present invention may be that which is commercially available. The amount of gum arabic employed is suitably about 0.1 to 4 in a weight ratio to the urea employed; preferably the weight ratio to urea is 0.2 to 2.

The present invention is characterized in that, upon formation of the capsule wall by the reaction of urea and formaldehyde, gum arabic is present; however, in order to further improve the properties of the capsules formed, anionic high molecular weight electrolytes can also be employed in combination with the gum arabic.

As anionic high molecular weight electrolytes, both natural and synthetic electrolytes can be employed, for example, those containing a $-COO^-$ group, a $-SO_3^-$ group, etc. Specific examples thereof are maleic anhydride (including hydrolyzed maleic anhydride) copolymers, acrylic acid (and methacrylic acid) polymers and copolymers, vinyl benzene sulfonic acid polymers and copolymers, carboxy-modified polyvinyl alcohol, etc.

Specific examples of maleic anhydride copolymers (including hydrolyzed copolymers) are styrene-maleic anhydride copolymers, methyl vinyl ether-maleic anhydride copolymers, ethylene-maleic anhydride copolymers, vinyl acetate-maleic anhydride copolymers, methacrylic amide-maleic anhydride copolymers, isobutylene-maleic anhydride copolymers, etc., wherein the weight average molecular weight is preferably about 5,000 to about 2,000,000, and the maleic anhydride content in the copolymers is preferably about 10 to 60 mol%.

Specific examples of acrylic acid copolymers are methyl acrylate-acrylic acid copolymers (hereafter the term "copolymers" is omitted for brevity), ethyl acrylate-acrylic acid, methyl acrylate-methacrylic acid, methyl methacrylate-acrylic acid, methyl methacrylate-methacrylic acid, butyl acrylate-acrylic acid, butyl methacrylate-acrylic acid, octyl acrylate-acrylic acid, methyl acrylate-acrylamide-acrylic acid, butyl acrylate-acrylamide-methacrylic acid, acrylonitrile-acrylic acid, acrylonitrile-methacrylic acid, styrene-acrylic acid, styrene-methacrylic acid, vinyl toluene-acrylic acid, hydroxyethyl acrylate-acrylic acid, hydroxyethyl methacrylate-methacrylic acid, vinyl acetate-acrylic acid, vinyl acetate-methacrylic acid, acrylamide-acrylic acid, acrylamide-methacrylic acid, acrylamide-methylol acrylamide-acrylic acid, acrylamide-methylol acrylamide-methacrylic acid, methacrylamide-acrylic acid, methacrylamide-methacrylic acid, methacrylamide-methylol acrylamide-acrylic acid, methacrylamide-methylol acrylamide-methacrylic acid, N-methylacrylamide-methacrylic acid, N-ethylacrylamide-acrylic acid, N,N-dimethylacrylamide-acrylic acid, N,N-dimethylacrylamide-methacrylic acid, N,N-diethylacrylamide-acrylic acid, butylacrylamide-acrylic acid, dimethyl itaconate-acrylic acid, dihexyl itaconate-acrylic acid, acrylonitrile-acrylamide-acrylic acid, acrylamide-acrylic acid-methacrylic acid, acrylamide-styrene-acrylic acid, acrylamide-dimethyl itaconate-acrylic acid, etc., and alkali metal salts thereof, and the like.

It is preferred that weight average molecular weight of these acrylic polymers be about 20,000 to about 1,000,000. Further, it is preferred that the acrylic or methacrylic acid (or salt thereof) content in these copolymers be about 5 to 100 mol%.

Typical examples of vinylbenzene sulfonic acid copolymers include methyl acrylate-vinylbenzene sulfonic acid (or salts thereof) copolymers, vinyl acetate-vinylbenzene sulfonic acid copolymers, acrylamide-vinylbenzene sulfonic acid copolymers, acryloylmorpholine-vinylbenzene sulfonic acid copolymers, vinylpyrrolidone-vinylbenzene sulfonic acid copolymers, etc. Further it is preferred that the amount of vinylbenzene sulfonic acid in the polymer is about 5 to 100 mol%.

It is preferred that the weight average molecular weight of these vinylbenzene sulfonic acid type polymers be about 5,000 to about 2,000,000, more preferably about 10,000 to 1,000,000, most preferably about 20,000 to 500,000.

THe carboxylated polyvinyl alcohols which may be employed in the present invention have a weight average molecular weight of about 1,000 to about 300,000, preferably about 10,000 to 150,000, morepreferably about 10,000 to 100,000; a saponification degree of 80% or more, preferably 90% or more and a carboxy group content of about 1 to about 40 mol%. Carboxylated polyvinyl alcohols can be prepared by various methods. For example, (1) by copolymerizing a carboxy group-containing vinyl or vinylidene monomer (e.g., those monomers described in Canadian Patent 929,430, e.g., acrylic acid, methacrylic acid, fumaric acid, itaconic acid, maleic acid, crotonic acid, etc.) with a vinyl ester (e.g., esters of vinyl alcohols and carboxylic acids containing one to five carbon atoms, such as a vinyl acetate ester, etc.) and hydrolyzing the resulting copolymers, or (2) by reacting polyvinyl alcohol with polybasic acid derivatives (e.g., acid anhydrides, acid halides and the like) whereby carboxy groups are introduced into the side chains of the polyvinyl alcohol. For example carboxylated polyvinyl alcohols can be prepared as described in Japanese Patent Publication 38753/1976.

Carboxylated polyvinyl alcohols prepared using either method described above can be employed in the present invention. Specific examples of carboxylated polyvinyl alcohols include, for example, a partially esterified product prepared by the reaction of polyvinyl alcohol with malonic acid, maleic acid, terephthalic acid or an anhydride or acid chloride thereof.

Where anionic high molecular weight electrolytes are employed in combination with gum arabic, desired effects are not obtained with a reduced amount of gum arabic. Therefore, it is preferred that gum arabic be employed in a weight ratio of 1/10 or more based on the anionic high molecular weight electrolytes. Particularly when employed in a ratio of ¼ or more, good results are obtained.

By modifying the ratio of gum arabic to the anionic high molecular weight electrolytes, the viscosity of the capsule solution can be easily adjusted. That is, where a capsule solution having a lower viscosity is required, it is achieved by increasing the ratio of gum arabic to the anionic high molecular weight electrolytes.

It is suitable that the total amount of gum arabic and the anionic high molecular weight electrolytes present in the capsule preparation system be about 0.1 to about 4 in a weight ratio to the urea amount, more preferably 0.2 to 2.

Of these anionic high molecular weight electrolytes, particularly when isobutylene-maleic anhydride copolymers, vinyl acetate-maleic anhydride copolymers, methyl vinyl ether-maleic anhydride copolymers, carboxy-modified polyvinyl alcohols or polyacrylic acids are employed, the amount of the gum arabic and anionic high molecular weight electrolytes employed to urea can be reduced in comparison to when other anionic high molecular weight electrolytes are employed.

The process for encapsulation of the present invention will now be explained in detail hereafter.

The process of the present invention basically comprises the following steps:
(1) an aqueous system containing gum arabic and urea or an aqueous system containing gum arabic, anionic high molecular weight electrolytes and urea is prepared.
(2) A hydrophobic oily solution which is substantially insoluble in the above system, which becomes the nuclear meterial is emulsion-dispersed in the solution system.
(3) Formaldehyde is added thereto.
(4) Urea is copolymerized with formaldehyde while stirring the system.

As one skilled in the art will immediately recognize there is a lot of flexibility in the above process and the order of addition can be varied. For example, urea can be added to the system after step (2) or before step (4) instead of at step (1).

The presence of ammonium salts of acids at the time of the polymerization reaction can accelerate the polymerization reaction. The acid making up the acidic ammonium salt may be inorganic acid or organic acid having a $pKa \leq 5$, preferably $pKa \leq 2$, most preferably $pKa \leq -1$. Examples of an inorganic acid include hydrogen selenide, hydrogen fluoride, nitrous acid, chlorous acid, phosphoric acid, arsenic acid, phosphorous acid, sulfurous acid, periodic acid, hypophosphorous acid, pyrophosphoric acid, iodic acid, chloric acid, chromic acid, nitric acid, permanganic acid, selenic acid, sulfonic acid, hydrochloric acid, perchloric acid, hydrogen bromide, hydrogen iodide, etc. Examples of organic acid include formic acid, acetic acid, propionic acid, trifluoroacetic acid, trichloroacetic acid, acrylic acid, benzoic acid, naphthoic acid, benzenesulfonic acid, naphthalenesulfonic acid, p-toluenesulfonic acid, oxalic acid, malonic acid, succinic acid, glutaric acid, adipic acid, oxaloacetic acid, maleic acid, fumaric acid, tartaric acid, phthalic acid, citric acid, etc. Preferred examples of the ammonium salts include ammonium chloride, ammonium sulfate, ammonium nitrate and ammonium dihydrogen-phosphate. These salts are usually added after step (2).

As suitable nuclear materials for forming the individual microcapsules, mention may be made of natural mineral oils, animal oils, vegetable oils, synthetic oils and the like. Examples of the mineral oils include petroleum and petroleum fractions such as kerosene, gasoline, naphtha and paraffin oil. Examples of the animal oils include fish oils, lard oil and the like. Examples of the vegetable oils include peanut oil, linseed oil, soybean oil, castor oil, corn oil and the like. Examples of the synthetic oils include biphenyls (e.g., isopropyl biphenyl, isoamyl biphenyl, etc.), terphenyl compounds (e.g., those which are described in German Patent Application OLS No. 2,153,635), phosphoric acid compounds (e.g., triphenyl phosphate), naphthalene compounds (e.g., diisopropylnaphthalene described in German Patent Application OLS No. 2,141,194 and U.S. Pat. No. 4,003,589), methane compounds (e.g., 2,4-dimethyl-diphenyl methane which are described in German Patent Application OLS No. 2,153,634 and U.S. Pat. No. 3,836,383), phthalic acid compound (e.g., diethyl phthalate, dibutyl phthalate, dioctyl phthalate, etc.), salicylic compounds (e.g., ethyl salicylate) and the like. These oils are usually employed in an amount of about 5 to 50 wt %, preferably about 20 to 40 wt %.

To these natural mineral oils, animal oils, vegetable oils and synthetic oils; agricultural chemicals, medicines, perfumes, chemicals, adhesives, liquid crystals, foods, cleaning materials, the dyestuff precursors, color developers, catalysts, rust inhibitors and the like can be suitably admixed depending upon the use.

For carrying out the polymerization of urea and formaldehyde in the present invention, the pH of the entire system must be adjusted to 7.0 or lower, preferably below 5.0, more preferably below 4.5. In addition the temperature of the entire system should be adjusted to 10° to 95° C., preferably 25° to 85° C., more preferably 35° to 75° C., most preferably 50° to 70° C.

The molar ratio of formaldehyde employed to urea is preferably about 0.6 to 5.0, more preferably about 1.0 to 4.0, most preferably about 1.4 to 3.0.

In the present invention, polyvalent phenolic substances can also be employed in combination upon the reaction of urea and formaldehyde. Specific examples of polyvalent phenolic substances include resorcine, catechol, pyrogallol, furologlucine, gallic acid, hydroquinone, orcine, tannic acid, etc. If these are employed, the phenolic acid substances may be employed in an amount of about 5 to 50 wt% based on the urea.

The term urea-formaldehyde resins as used in the present invention is used in a little wider sense and is not strictly limited to resins consisting of urea and formaldehyde but includes amino resins. Amino resins, in general, are those prepared from compounds having at least two amino groups in one molecule, urea, and aldehydes by polymerization reaction. Examples of such amines include guanidine, N-methyl urea, thiourea and malamine. In this specification the term urea-formadehyde resins also includes these amino modified urea-formaldehyde resins. Generally the amine may be added when preparing the carboxylated polyvinyl alcohol and urea solution during the process or after emulsifying the dispersing the oily solution. As another alternative the amine can be added when admixing formaldehyde. The amount of the amine may be 0 to 1 mol per mol of urea. U.S. Pat. No. 4,001,140 discloses the use of amino resins in forming microcapsules.

The size of microcapsules can suitably be chosen depending upon utility. Where microcapsules are employed in pressure sensitive recording sheets, it is preferred that the capsule size be about 1 to 20 microns, more preferably about 1.5 to 10 microns, and most preferably about 2 to 8 microns.

The present invention is extremely useful for the preparation of microcapsules, particularly for the preparation of microcapsules for pressure sensitive recording sheets. That is, according to the process of the present invention, a capsule solution having high concentration and low viscosity can be obtained. In addition, microcapsules prepared in accordance with the present invention exhibit good heat resistance and possess excellent efficiency, providing low permeability. The term "heat resistance" used herein relates to the ability of the microcapsules to retain the core substance when the microcapsules which have been coated and dried are allowed to stand at 100° C. for 10 hours in an oven. The more core substance the capsules retain, the better are the capsules.

In the system in accordance with the present invention, the problem with washing out the reaction vessel has also been solved and pronounced effects have been attained in manufacture. In addition, according to the present invention, gum arabic is less expensive than anionic high molecular electrolytes so that reduction in cost of raw material is also advantageous. Furthermore, capsules having good heat resistance can be obtained in a shortened reaction time in the present invention as compared to the urea-formaldehyde resin wall-forming system described in U.S. Pat. No. 4,001,140 in which maleic anhydride copolymers such as ethylene-maleic anhydride copolymer, vinyl methyl ether-maleic anhydride copolymers, isobutylene-maleic anhydride copolymers or the like are employed. By the use of gum arabic the desired capsules are obtained in a reaction time about ½ the time it takes to obtain them using maleic anhydride type copolymer electrolytes which is quite an unexpected effect.

The microcapsule solution prepared in accordance with the present invention is coated onto a support such as a paper sheet in a conventional manner using an appropriate technique. Specifically, a curtain coating method as is described in U.S. Pat. No. 3,508,947, a blade coating method as described in Japanese Patent Publication 35330/1974, or an air knife coating method, etc. are appropriate because they can easily adopt to the difference in the viscosity of the capsule solutions which depends upon the coating method.

As mentioned above, the present invention is best suited for the production of the microcapsules used in a pressure sensitive recording sheets. In constructing pressure sensitive recording sheets, a coating containing microcapsules, binder and protecting agent, and a coating containing a color developer as a main component may both be coated on the same side of a support, they may be coated separately on opposite sides of the same support, or the mcirocapsules coating may be coated on the surface of one support and the coating containing the color developer coated on another support.

The present invention can be used in various fields and applications as described above, but preferably the present invention is used for the production of a microcapsules used in a self-developing type pressure sensitive recording sheets wherein high precision is required. The color former (dye precursor), binder, color developer, etc. which are used in the production of the pressure sensitive recording sheets are not specifically limited and the materials conventionally used in the art can be used. Specific examples of the color former, the binder, the color developer, etc. are disclosed in U.S. Pat. Nos. 3,871,900, 3,900,669, 3,955,026 and 3,970,769.

The present invention will be explained in more detail by reference to the following examples, but the present invention is not limited thereto.

EXAMPLE 1

Gum arabic powders were dissolved in water to prepare a 10 wt % aqueous solution thereof. In 100 parts of this aqueous solution were dissolved 10 parts of urea and 1 part of resorcinol while stirring. Thereafter, pH of the system was adjusted to 3.5 using a 20% sodium hydroxide aqueous solution.

100 parts of diisopropylnaphthalene in which 2.5% of crystal violet lactone and 1.0% benzoyl leucomethylene blue had been dissolved were added to the aforementioned aqueous solution while vigorously sitrring to emulsify and thereby form an oil in water emulsion. Stirring was stopped when the average oil droplet size was 5 microns.

To this emulsion were added 6 parts of a 10 wt % ammonium chloride aqueous solution. While continuing to stir, 27 parts of a 37% formaldehyde aqueous solution was added thereto and the temperature of the system was adjusted to 65° C. Then, the temperature was maintained for 2 hours while continuing to stir, and thereafter lowered to 25° C. and the pH of the system was adjusted to 9.0 using a 20% sodium hydroxide aqueous solution to obtain a capsule solution containing a color former oil.

The so-obtained color former oil-containing capsule solution was diluted with water so as to provide a color former oil content of 30 wt %. The viscosity of the capsule solution was measured at 23° C. and was 22 cps.

The capsule solution obtained in this example is useful for preparation of pressure sensitive recording paper.

EXAMPLE 2

In this example, the system in which Isoban-10 (tradename, made by Kurashiki Rayon Co., Ltd., molecular weight 160,000–170,000, a copolymer of isobutylene and maleic anhydride in a 1:1 molar ratio) was used as an anionic high molecular weight electrolyte in combination as shown.

Isoban-10 was dissolved in water with heating using sodium hydroxide so as to have neutralization degree of 0.8. Thus, a 10 wt % aqueous solution was prepared. Capsule solutions were prepared in a manner similar to Example 1 except that this 10 wt % aqueous solution of Isoban-10 and a 10 wt % aqueous solution of gum arabic were employed in a mixing ratio (by weight) of gum arabic: Isoban-10 of 3:1, 1:1 and 1:3, in lieu of the 10 wt % gum arabic aqueous solution of Example 1. For comparison, a capsule solution was further prepared in a manner similar to Example 1 except that Isoban-10 was employed alone. 5 N hydrochloric acid was used to adjust the pH to 3.5.

The so obtained color former oil-containing capsule solutions were treated in a manner similar to Example 1 and the viscosity of each solution was measured. The results obtained are shown in Table 1.

TABLE 1

| Gum Arabic:Isoban-10 | Viscosity[cps] 23° C. |
|---|---|
| 3:1 | 45 |
| 1:1 | 86 |
| 1:3 | 140 |
| 0:1 | 260 |

From the results as shown in Table 1 above, when Isoban-10 is employed alone, the viscosity of the capsule solution is remarkably increased but the viscosity of the capsule solution is reduced in accordance with an increase in the amount of the gum arabic substituted.

While the invention has been described in detail and with reference to specific embodiments thereof, it will be apparent to one skilled in the art that various changes and modifications can be made therein without departing from the spirit and scope thereof.

What is claimed is:

1. A process for preparing microcapsules which comprises polymerizing urea and formaldehyde in the presence of gum arabic to thereby form a urea-formaldehyde resin wall around a previously dispersed hydrophobic oily solution.

2. The process of claim 1, wherein the anionic high molecular weight electrolyte is employed in combination with gum arabic.

3. The process of claim 2, wherein said anionic high molecular weight electrolyte is selected from the group consisting of maleic anhydride copolymers, acrylic acid or methacrylic acid homopolymers and copolymers, vinylbenzenesulfonic acid homopolymers and copolymers and carboxy-modified polyvinyl alcohol.

4. The process of claim 1, wherein an ammonium salt of an acid is also present in the polymerization system.

5. The process of claim 4, wherein said ammonium salt is selected from the group consisting of ammonium chloride, ammonium sulfate, ammonium nitrate and ammonium dihydrogen phosphate.

6. The process of claim 1, wherein the weight ratio of gum arabic to said urea is about 0.1 to 4.

7. The process of claim 1, wherein the weight ratio of gum arabic to said urea is about 0.2 to 2.

8. The process of claim 2, wherein the weight ratio of gum arabic to said high molecular weight electrolyte is 1/10 or more.

9. The process of claim 2, wherein the weight ratio of gum arabic to said high molecular weight electrolyte is ¼ or more.

10. The process of claim 2, 8 or 9, wherein the combined weight ratio of gum arabic and said high molecular weight electrolyte to said urea is 0.1 to 4.

11. The process of claim 2, 8 or 9, wherein the combined weight ratio of gum arabic and said high molecular weight electrolyte to said urea is 0.2 to 2.

12. The process of claim 3, 8 or 9, wherein said high molecular weight electrolyte is selected from the group consisting of isobutylene-maleic anhydride copolymers, vinyl acetate-maleic anhydride copolymers, methyl vinyl ether-maleic anhydride copolymers, carboxy-modified polyvinyl alcohols and polyacrylic acids.

13. The process of claim 1 which comprises: forming an aqueous system containing gum arabic, dispersing a hydrophobic oily solution in said system, adding formaldehyde and urea thereto simultaneously or at separate times and copolymerizing said urea and formaldehyde around the walls of said dispersed oily solution.

14. The process of claim 13 which comprises: forming an aqueous system of gum arabic and urea, dispersing a hydrophobic oily solution in said system, adding formaldehyde thereto and copolymerizing said urea and formaldehyde.

15. The process of claim 14, wherein a high molecular weight electrolyte is also in said aqueous system with gum arabic.

16. A pressure-sensitive recording sheet comprising a support having coated thereon microcapsules prepared by the process of claim 1 or 2.

* * * * *